No. 807,435. PATENTED DEC. 19, 1905.
S. R. BURGMAN.
SHEEP SHEARING MACHINE.
APPLICATION FILED MAY 23, 1905.
2 SHEETS—SHEET 1.
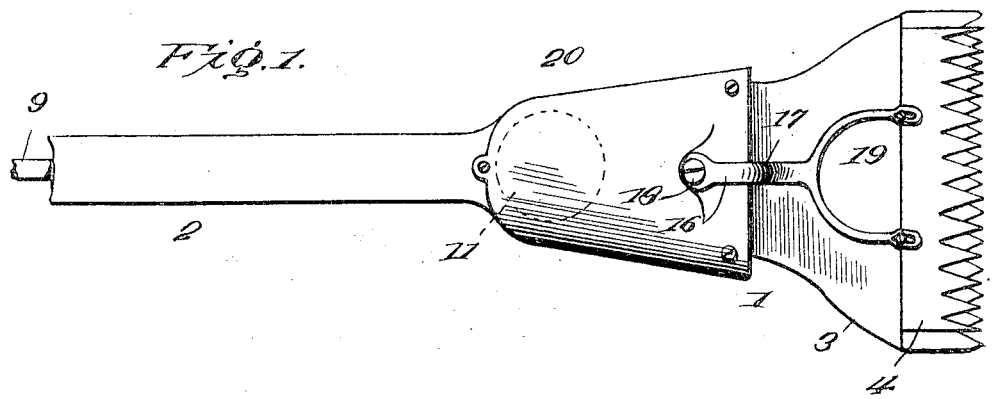
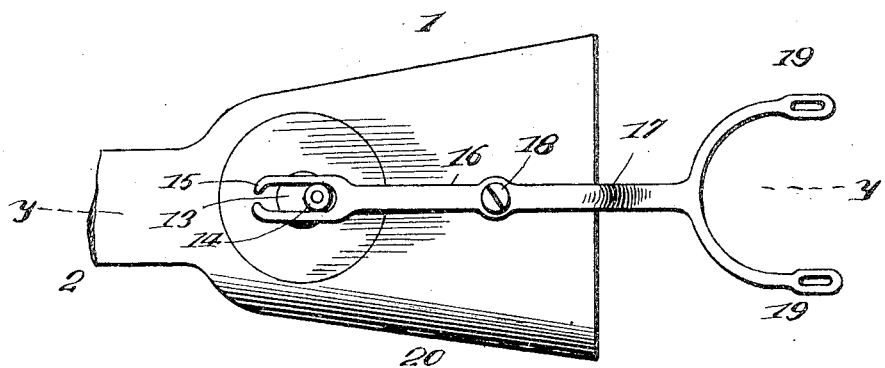
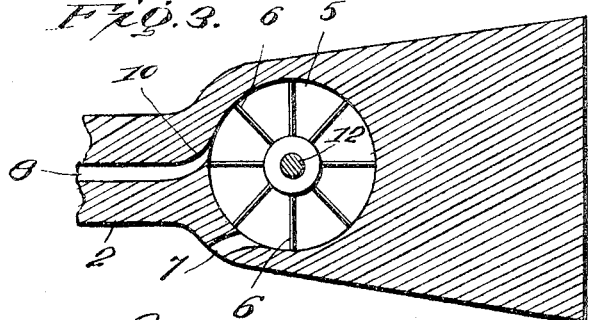

No. 807,435. PATENTED DEC. 19, 1905.
S. R. BURGMAN.
SHEEP SHEARING MACHINE.
APPLICATION FILED MAY 23, 1905.
2 SHEETS—SHEET 2.
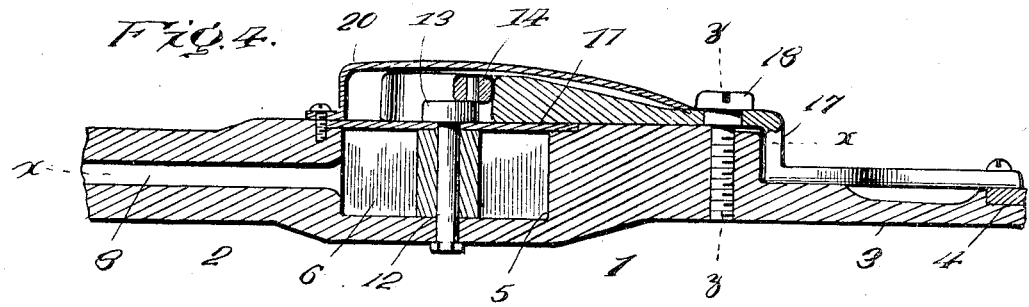
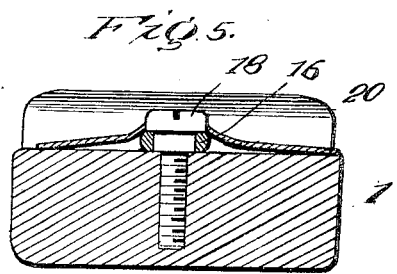
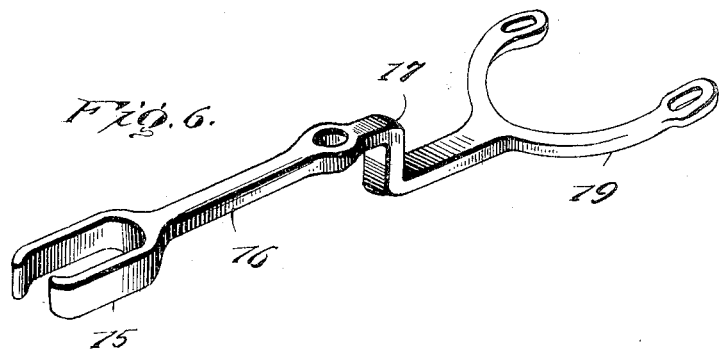
Witnesses
Inventor
S. R. Burgman
By
Lacey, Attorneys

UNITED STATES PATENT OFFICE.

SETH R. BURGMAN, OF IONIA, WYOMING.

SHEEP-SHEARING MACHINE.

No. 807,435.　　　Specification of Letters Patent.　　　Patented Dec. 19, 1905.

Application filed May 23, 1905. Serial No. 261,848.

*To all whom it may concern:*

Be it known that I, SETH R. BURGMAN, a citizen of the United States, residing at Ionia, in the county of Bighorn and State of Wyoming, have invented certain new and useful Improvements in Sheep-Shearing Machines, of which the following is a specification.

The purpose of this invention is the provision of a clipping-machine designed most especially for shearing sheep, although it may be used for clipping horses or other animals when it is required to divest them of their hirsute.

One of the principal objects of the invention is to do away with the complex mechanism heretofore generally employed in machines of this type for transmitting motion from a suitable source of power to the cutting mechanism. This is attained in accordance with this invention by utilizing a fluid, such as compressed air, as the motive means, and by mounting in the handle or frame of the cutting mechanism a motor-wheel adapted to be driven by a jet of air or like fluid medium, said motor-wheel being connected to the movable member of the cutting mechanism by means of a lever in any suitable manner.

For a full description of the invention and the merits thereof, and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a top plan view of a sheep-shearing or cutting machine embodying the invention. Fig. 2 is a view similar to Fig. 1, showing the parts on a larger scale, the cutting mechanism being omitted and the cap-plate removed. Fig. 3 is a horizontal section of the main frame on the line *x x* of Fig. 4. Fig. 4 is a longitudinal section of the machine on the line *y y* of Fig. 2. Fig. 5 is a transverse section on the line *z z* of Fig. 4. Fig. 6 is a detail perspective view of a lever for transmitting motion to the cutting mechanism.

Corresponding and like parts are referred to in the following description and indicated in all the views of the drawings by the same reference characters.

The machine comprises a frame 1, having a handle 2, a front extension 3, to which is attached a fixed cutter with which the movable cutter 4 operates. A circular recess or chamber 5 is formed in the frame 1 and constitutes a cylinder in which is mounted a motor-wheel 6. An opening 7 extends upwardly from the wheel of the chamber or cylinder 5 and constitutes an exhaust through which the spent motive medium escapes. A longitudinal passage 8 is formed in the handle 2 of the frame and is connected by a flexible tube 9 with a suitable source of motive-medium supply. The inner end of the passage 8 curves laterally, as shown at 10, to direct the jet upon the blades or flights of the motor-wheel at a tangent, so as to secure the most advantageous expenditure of the motive medium in operating the machine. A plate 11 closes the open side of the cylinder 5 and is secured to the frame 1 by suitable fastenings and is preferably let into the frame so as to come flush with the top side thereof. The axle 12, to which the motor-wheel 6 is made fast, is mounted at its ends in the plate 11 and in the part of the frame closing the opposite side of the cylinder, and said axle is provided at its upper projecting end with a crank-wheel 13, whose wrist-pin is provided with a roller 14 for operation with the members of a fork 15 at the inner end of lever 16. The lever 16 is formed with an offset 17 about midway of its ends to throw its opposite end portions in different planes. A screw 18 pivotally connects the lever 16 with the frame 1 and may be utilized to brace the movable cutter 4 upon the fixed cutter with a greater or less degree of pressure. The front end of the lever 16 is forked, as shown at 19, to make connection with lugs of the movable cutter 4. The rear portion of the lever 16, including the crank-wheel 13 and fork 15, is housed by means of a cap-plate 20, which is secured to the frame 1 in any manner.

In operation the handle 2 has its passage 8 connected by a flexible tube with means for supplying compressed air or other form of fluid motive medium which when turned on causes the motor-wheel 6 to rotate and through connection with the crank-wheel 13 and fork 15 imparts an oscillatory movement to the lever 16 and a corresponding reciprocating movement to the cutter 4, and the machine thus being set in motion is adapted for use in the usual manner.

It will be understood that connecting parts, such as tumbling-rods and flexible shifting-rods, are dispensed with, thereby admitting of a greater range of movement of the machine.

Having thus described the invention, what is claimed as new is—

1. A sheep-shearing machine comprising a frame provided with cutting mechanism and having a circular recess or chamber forming a cylinder and provided with inlet and exhaust openings in communication with said cylinder, and a motor-wheel mounted in the cylinder and adapted to actuate the cutting mechanism.

2. A sheep shearing or clipping machine comprising a frame provided with cutting mechanism and having a circular recess or chamber forming a cylinder and provided with inlet and exhaust openings, arranged to operate in the said cylinder, a cap-plate closing the open side of the cylinder and forming a bearing for the axle of the motor-wheel, a crank fast to the projecting end of the motor-wheel axle, and a lever fulcrumed near its ends to the frame and having a fork operating with the crank-wheel whereby said lever is oscillated and adapted to transmit motion to the cutting mechanism.

3. A sheep shearing or clipping machine comprising a frame provided with cutting mechanism and having a circular recess or chamber forming a cylinder and provided with inlet and exhaust openings arranged to operate in the said cylinder, a cap-plate closing the open side of the cylinder and forming a bearing for the axle of the motor-wheel, a crank fast to the projecting end of the motor-wheel axle, a lever fulcrumed near its ends to the frame and having a fork operating with the crank-wheel whereby said lever is oscillated and adapted to transmit motion to the cutting mechanism, and a cover attached to the frame and forming a housing for the rear portion of said lever and the crank-wheel cooperating therewith.

4. In a sheep-shearing machine or clipper, a frame having a handle and provided with a circular depression forming a cylinder and having a passage extending through the handle and in communication at its inner end with said cylinder and formed with an exhaust-opening, a motor-wheel arranged in the cylinder, a cap-plate closing the open side of the cylinder, a crank-wheel fitted to the projecting end of the motor-wheel axle, a power-transmitting lever having an offset between its ends and fulcrumed to the frame adjacent to the offset and having its rear end forked to resist said crank-wheel, and a covering for the rear portion of said lever and crank-wheel and forming a housing therefor.

In testimony whereof I affix my signature in presence of two witnesses.

SETH R. BURGMAN. [L. S.]

Witnesses:
A. E. ROSS,
OWEN SPENCE.